United States Patent [19]

Strong et al.

[11] 4,124,690

[45] Nov. 7, 1978

[54] ANNEALING TYPE IB OR MIXED TYPE IB-IA NATURAL DIAMOND CRYSTAL

[75] Inventors: Herbert M. Strong, Schenectady; Richard M. Chrenko, Scotia; Roy E. Tuft, Guilderland Center, all of N.Y.

[73] Assignee: General Electric Company, Schenectady, N.Y.

[21] Appl. No.: 856,905

[22] Filed: Dec. 2, 1977

Related U.S. Application Data

[63] Continuation of Ser. No. 707,299, Jul. 21, 1976, abandoned.

[51] Int. Cl.$^2$ ............................................. C01B 31/06
[52] U.S. Cl. ....................................... 423/446; 51/307
[58] Field of Search ........................... 423/446; 51/307

[56] References Cited

U.S. PATENT DOCUMENTS

| | | | |
|---|---|---|---|
| 3,083,080 | 3/1963 | Bovenkerk | 423/446 |
| 3,141,746 | 7/1964 | Delai | 51/307 |
| 3,297,407 | 1/1967 | Wentorf | 423/446 |
| 3,423,177 | 1/1969 | Bovenkerk | 423/446 |
| 3,574,580 | 4/1971 | Stromberg et al. | 51/307 |
| 4,073,380 | 2/1978 | Strong et al. | 423/446 X |

OTHER PUBLICATIONS

Klyuev et al, Sov. Phys. Solid State, vol. 16, No. 11, May, 1975, pp. 2118-2121.

*Primary Examiner*—Edward J. Meros
*Attorney, Agent, or Firm*—Jane M. Binkowski; Joseph T. Cohen; Charles T. Watts

[57] ABSTRACT

Type Ib or mixed type Ib-Ia natural diamond crystal is annealed at an annealing temperature ranging from about 1500° C to about 2200° C under a pressure which prevents significant graphitization of the diamond during the annealing to convert at least 20% of the total amount of type Ib nitrogen present in the crystal to type Ia nitrogen.

3 Claims, 3 Drawing Figures

ANNEALING TYPE IB OR MIXED TYPE IB-IA NATURAL DIAMOND CRYSTAL

This is a continuation, of application Ser. No. 707,299, filed July 21, 1976, now abandoned.

This invention relates to the annealing of natural diamond type Ib or mixed type Ib-Ia to convert at least a portion of type Ib nitrogen to type Ia nitrogen.

Diamonds are generally classified into four main types: Ia, Ib, IIa, and IIb. These types are most easily distinguished by infrared and ultraviolet spectra and sometimes by electron paramagnetic resonance (EPR). Type Ia and Ib diamonds contain dissolved nitrogen; in Ia diamonds, most of the nitrogen is not EPR active and appears to be in aggregated form; in Ib diamonds most of the nitrogen is EPR active, and is atomically dispersed. Types IIa and IIb diamonds do not contain appreciable nitrogen. Each type of diamond has typical infrared and ultraviolet spectra with characteristic features.

The large majority of synthesized diamonds are type Ib, but type IIa diamonds can easily be made either by excluding nitrogen from the diamond growing media or by using appropriate nitrogen getters.

The large majority of natural diamonds examined are type Ia. No Type Ia diamonds have been synthesized thus far in the laboratory. Natural type Ia diamond crystals can have a variety of colors, with many being a pale yellow to colorless. Such a diamond crystal can also be a combination of pale yellow color and colorless areas as well as exhibit local variations in its characteristic color in different parts of the crystal. Ordinarily, it has a rounded dodecahedral or octahedral morphology.

Less than 1% of natural diamonds are type Ib, and usually natural diamonds of a mixed type Ib-Ia are found which can range widely in type Ib nitrogen content. Ordinarily, natural type Ib diamond crystal has a morphology exhibited in natural type Ia diamond crystals.

Synthetic diamonds are substantially the same as natural diamonds but there are enough differences between them to distinguish between the natural and synthetic crystals. These differences are mainly in morphology, surface appearance, impurity inclusions and the nature of impurity imperfections such as the different forms of nitrogen. As found, natural diamond crystals most frequently have curved edges and convex faces. On the other hand, synthetized diamond crystals, as grown, have sharp edges, flat and relatively smooth faces. Depending on the conditions of growth, synthetic type Ib crystals have octahedral or cubo-octahedral morphology, the latter sometimes having small (113) faces. Impurity inclusions in synthetic diamonds are metal catalysts whereas in natural diamonds they are a variety of minerals, and these impurity inclusions are detectable by several techniques such as electron diffraction analysis or X-ray analysis.

Those skilled in the art will gain a further and better understanding of the present invention from the detailed description set forth below, considered in conjunction with the figures accompanying and forming a part of the specification in which.

Figure 1:
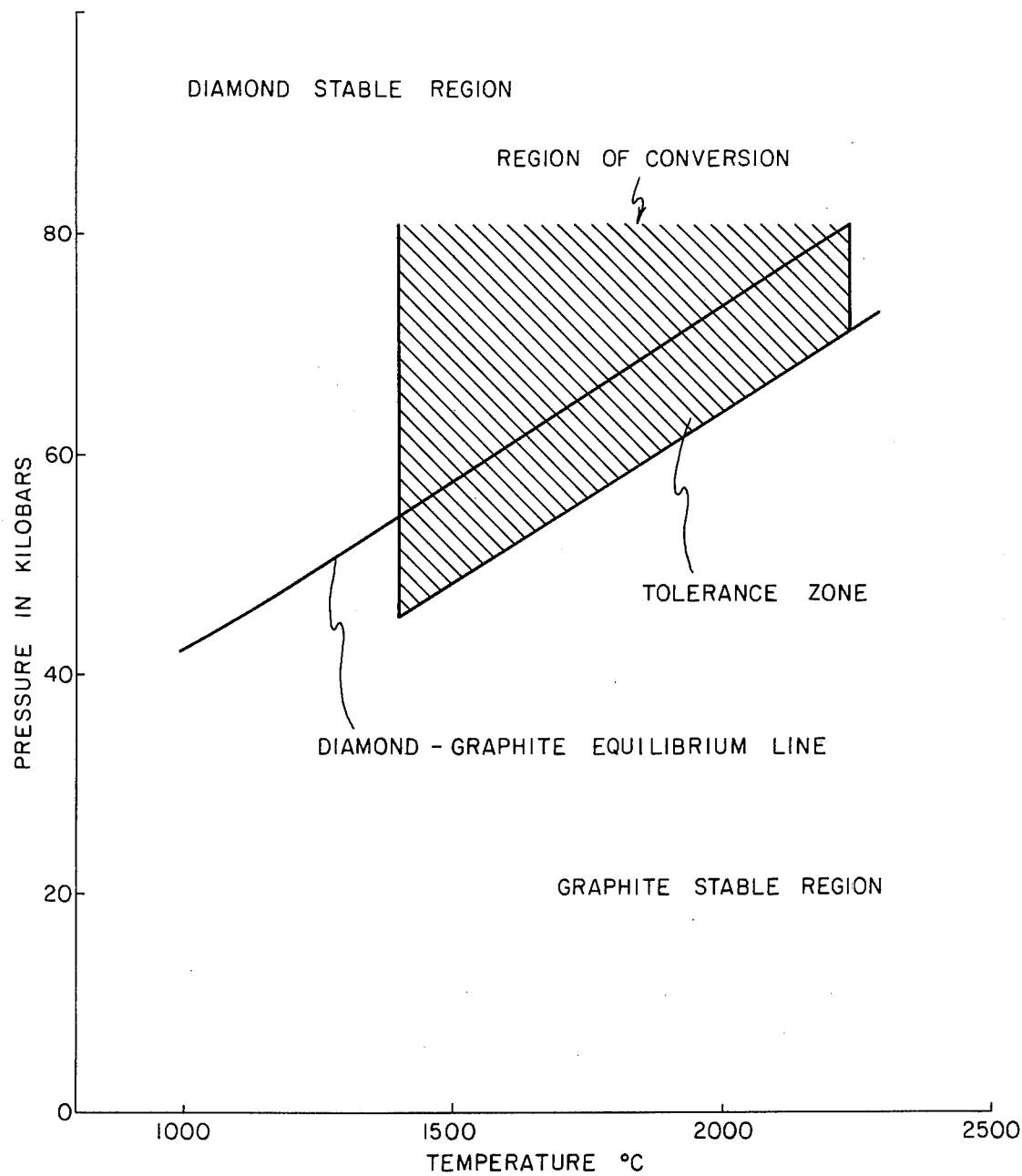
FIG. 1 represents the phase diagram of carbon showing the diamond-graphite equilibrium line and the shaded area defines the Region of Conversion which encompasses the required annealing temperatures and the corresponding annealing pressures of the present process.

According to the present process, type Ib or mixed type Ib-Ia natural diamond is annealed to convert type Ib nitrogen to type Ia nitrogen. Briefly stated, the present process comprises annealing type Ib or mixed type Ib-Ia natural diamond crystal at an annealing temperature ranging from about 1500° C. to about 2200° C. under a pressure which prevents significant graphitization of the diamond crystal during annealing to convert at least about 20% of the total amount of type Ib nitrogen present in the crystal to type Ia nitrogen.

In the present process the diamond crystal can be wholly type Ib or mixed type Ib-Ia. The mixed type crystal can range in type Ib nitrogen content from about 99% to about 1% of the total amount of nitrogen present in the crystal.

In the present process the amount of conversion of type Ib nitrogen to type Ia nitrogen is determinable by a number of conventional techniques. The most frequently used technique is one where it is revealed by the differences or changes in the absorption spectra of the Ib crystal taken before and after annealing. Specifically, spectra are taken of the type Ib or mixed type Ib-Ia crystal at room temperature by means of spectrometers in a conventional manner showing the ultraviolet, visible and infrared absorption spectra of the cyrstal. After the crystal is annealed, spectra are taken of it again at room temperature showing its ultraviolet, visible and infrared absorption spectra. From a comparison of the changes in these spectra, the amount of conversion of type Ib nitrogen to type Ia nitrogen is determinable in a conventional manner. Specifically, the percent of the total amount of type Ib nitrogen present in the crystal converted to type Ia nitrogen is determinable.

The present natural diamond crystals have a color depending largely on the amount of type Ib nitrogen dissolved therein. The color of the crystals usually range from a greenish-yellow to a yellow with the maximum or largest amount of dissolved type Ib nitrogen producing the greenish-yellow color. Likewise, the amount of type Ib nitrogen dissolved in the crystal largely determines the intensity of the yellow color which can range from a deep golden yellow to a pale yellow with the deep golden yellow indicating substantially more type Ib dissolved nitrogen than the pale yellow. In addition, the present natural diamond crystals can exhibit a mixture of greenish-yellow and/or yellow colors or shades, i.e. they can exhibit local variations in their characteristic color and intensity, which in general indicates regions of varying type Ib nitrogen content.

In the present process there is no limitation on the size of the diamond crystals. Specifically, the minimum size of the crystals can be one micron or less and the maximum size is limited only by the capacity of the annealing equipment. For most present applications, the crystal size ranges from about 0.25 millimeter to about 6 millimeters. The size of the diamond crystal given herein is that measured along the longest edge dimension of the crystal.

The present annealing process is carried out in high temperature-high pressure apparatus normally used for synthesizing diamonds by application of high temperatures and pressures to a suitable reaction mass or specimen.

One preferred form of a high pressure-high temperature apparatus in which the present invention can be carried out is disclosed by U.S. Pat. No. 2,941,248 — Hall which, by reference, is incorporated herein, and it is also disclosed in numerous other patents and publications. Those skilled in the art are well acquainted with this "belt-type" apparatus and, for this reason, the apparatus is not illustrated. Essentially, the apparatus consists of a pair of cemented tungsten carbide punches disposed to either side of an intermediate belt or die member of the same material. The space between the two punches and the die is occupied by the reaction vessel and surrounding gasket insulation assemblies therefor. High pressures are generated in the reaction vessel from the compressive forces caused by the relative movement of the co-axially disposed punches toward each other within the die. Means are provided for heating the reaction mass in the reaction vessel during the application of pressure.

There are, of course, various other apparatuses capable of providing the required pressures and temperatures that can be employed within the scope of this invention such as tetrahedral types, cubic types and spherical types. Operational techniques for applying high pressures and temperatures in the apparatuses useful in the present process are well known to those skilled in the superpressure art.

Various reaction vessel configurations which provide for indirect or direct heating of the reaction mass are disclosed in the patent literature and are useful in carrying out the present annealing process. These reaction vessels usually consist of a plurality of interfitting cylindrical members and end plugs or discs for containing the reaction mass in the centermost cylinder. In the indirectly heated type of reaction vessel one of the cylindrical members is made of graphite which is heated by the passage of electric current therethrough and which thereby heats the reaction mass. In the directly heated type of reaction vessel, the reaction mass is electrically conductive, hereby eliminating the need for an electrically conductive graphite cylinder, and electric current is passed directly through the reaction mass to heat it.

U.S. Pat. No. 2,941,248 — Hall discloses an embodiment of a reaction vessel wherein the reaction specimen is indirectly heated, as well as the alternative embodiment for directly heating the reaction specimen when it is electrically conductive.

U.S. Pat. No. 3,031,269 Bovenkerk which, by reference, is incorporated herein, discloses a reaction vessel for indirect heating of the reaction mass. Specifically, the outer element of the reaction vessel is a hollow pyrophyllite cylinder, positioned concentrically within and adjacent to the pyrophyllite cylinder is a graphite electrical resistance heater tube, and within the graphite tube there is concentrically positioned an alumina cylinder which holds the reaction mass or specimen.

Figure 2:
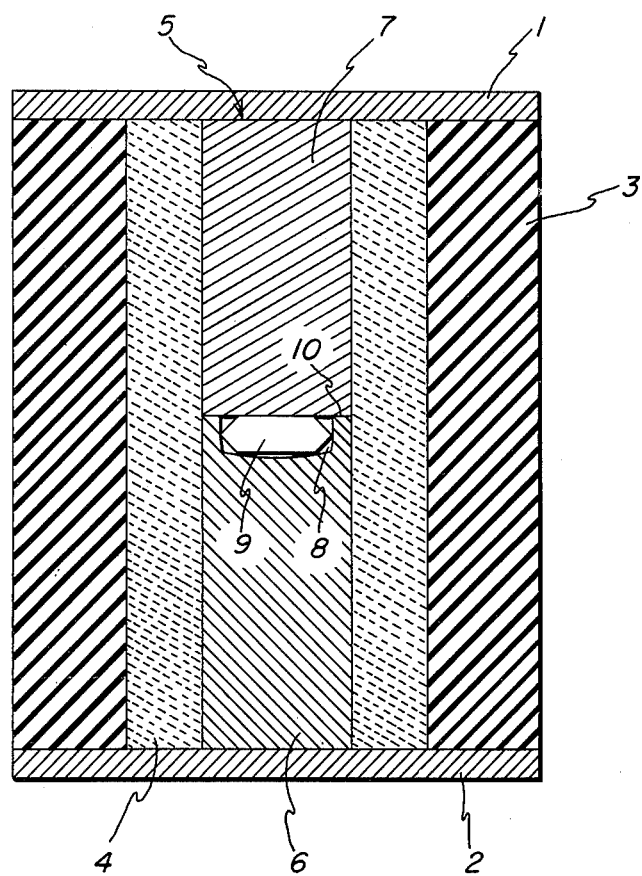
FIG. 2 is a sectional view of a preferred reaction vessel for carrying out the present invention.
Figure 3:
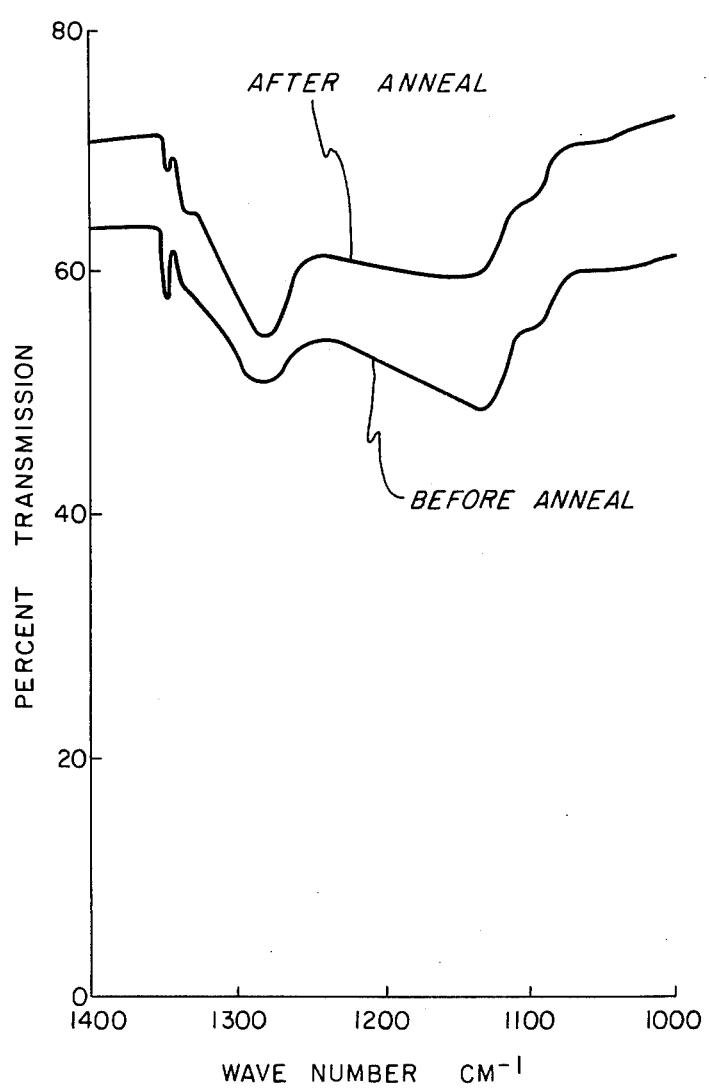
FIG. 3 shows infrared absorption spectra of a natural mixed type Ib-Ia diamond crystal taken before and after it was annealed in accordance with the present process showing that the annealing resulted in a conversion significantly higher than 20% of type Ib nitrogen to type Ia nitrogen.

The directly heated embodiment of the reaction vessel is preferred in the present process, and a particularly preferred form is shown in FIG. 2. Specifically, this reaction vessel includes a hollow outer cylinder 3 made of non-conducting material such as pyrophyllite. Positioned concentrically within and adjacent pyrophyllite cylinder 3 is ceramic cylinder 4 preferably made of alumina. Charge element or insert assembly 5 is adapted to fit concentrically in ceramic cylinder 4 and is dimensioned for a close fit with cylinder 4. Charge element 5 is comprised of graphite rod 7 and graphite rod 6 wherein the graphite is of spectroscopic purity. Graphite rod 6 has hole 8 which is drilled to fit closely around diamond crystal 9, i.e., the diamond to be annealed. Diamond crystal 9 should not project outside of hole 8 since such projection would prevent a close contiguous fit of rod 7 with rod 6. Rod 7 should be in electrical contact with rod 6 at surface 10. Preferably, the top surface of diamond 9 is flush with surface 10 of graphite rod 6. Any space between diamond crystal 9 and hole 8 is preferably filled with an electrically conducting material, such as graphite powder of spectroscopic purity, to promote passage of the electric current and thereby promote heating of diamond 9. Electrically conducting circular metallic discs 1 and 2 close the ends of graphite rods 6, 7, and cylinders 3 and 4. Discs 1 and 2 are preferably made of a metal such as nickel or tantalum and must be in electrical contact with graphite rods 7 and 6, respectively. Since graphite rod 6 is electrically conducting and diamond crystal 9 is not electrically conducting, the highest temperatures are attained and maintained at the thinnest portions of graphite rod 6, e.g., the area of graphite rod 6 surrounding diamond crystal 9.

After assembly of the reaction vessel and introduction thereof into the high pressure-high temperature apparatus within the gasket/insulation assemblies, preferably pressure is raised first and then the temperature. The rates of increase of pressure or temperature are not critical. When pressure and temperature are at a level in the Region of Conversion in FIG. 1, they are held at that level for a period of time sufficient to attain the desired conversion of at least about 20% of the diamond's Ib type nitrogen to type Ia nitrogen. When the desired conversion is attained, the electrical power which heats the diamond crystal is shut off and the crystal cools to about room temperature quickly usually in about 1 minute. Generally, when the crystal has cooled to below 50° C., the pressure is then released, preferably at a rate of about 10 kilobars per minute to atmospheric pressure.

In the present annealing process the diamond crystal is annealed at a temperature ranging from about 1500° C. to about 2200° C. Annealing temperatures lower than about 1500° C. are not operable or take too long a period of annealing time to be practical. Annealing temperatures higher than 2200° C. provide no significant advantage. Annealing temperatures ranging from 1600° C. to 2000° C. are preferred since they are not too difficult to attain, do not require excessively high pressures and since they induce high rates of conversion.

The pressure used in the present process need only be sufficient to maintain the diamond stable at the annealing temperature. Specifically, it is a pressure which prevents graphitization or prevents significant graphitization of the diamond crystal at the annealing temperature. The shaded area of FIG. 1 defines the Region of Conversion which defines the operable temperatures and corresponding annealing operable pressures of the present process. The diamond-graphite equilibrium line as well as pressure and temperature calibrations at such superpressures are not definitely known. The diamond-graphite equilibrium line shown in FIG. 1 is the best approximation known at present for diamond-graphite equilibrium. Preferably, the present process is carried out at or above this diamond-graphite equilibrium line. The shaded area in FIG. 1 of the Region of Conversion below the diamond-graphite equilibrium line is a tolerance zone which shows the lower pressures which are operable in the present process for limited periods of time. For example, for the minimum pressures shown by the tolerance zone, the maximum period of annealing time is about one hour without significant graphitization of the diamond crystal occurring. If annealing times longer than one hour are used, then the pressure applied in the tolerance zone should be closer to the diamond-graphite equilibrium line.

As shown in FIG. 1 by the Region of Conversion, an annealing temperature of about 1500° C. requires a pressure of at least about 48 kilobars, at 1600° C. the pressure should be at least about 51 kilobars and preferably about 61 kilobars, at 2000° C. the pressure should be at least about 63 kilobars and preferably about 74 kilobars, and at a temperature of about 2200° C. the pressure should be at least about 70 kilobars and preferably about 80 kilobars.

Annealing time, i.e. the period of time at annealing temperature and pressure, is determinable empirically and can range from about one minute to about 50 hours, and preferably up to about 20 hours. Usually it ranges from about 10 minutes to about 5 hours. Specifically, annealing time depends largely on annealing temperature, the kind of crystal being annealed as determined by its type Ib nitrogen content, and the extent or degrees of conversion of the type Ib nitrogen to Ia nitrogen required. With rising annealing temperatures, the rate of conversion of type Ib nitrogen to type Ia nitrogen increases significantly, i.e. more than five times in going from 1600° C. to 2200° C. The mechanism of the present process is not understood but it is believed that the rate of conversion of Ib nitrogen to Ia nitrogen does not differ significantly between a crystal of high type Ib nitrogen content and one of low type Ib nitrogen content, but the period of annealing time at a given annealing temperature to leave essentially the same amount of type Ib nitrogen in each crystal does differ since the crystal with the higher type Ib nitrogen content has more nitrogen to convert to type Ia nitrogen thereby requiring a longer annealing time.

While the detailed mechanism of the conversion process is not understood, annealing experiments have shown that the activation energy for the process is approximately 83 kilo-calories/mole (3.6 eV).

The extent of conversion of the type Ib nitrogen to Ia nitrogen is determinable empirically by a number of known methods in the art. For example, type Ia nitrogen is EPR inactive (Electron Paramagnetic Resonance) whereas type Ib nitrogen is EPR active. Also, types Ia and Ib nitrogen each have typical infrared, visible and ultraviolet spectra with characteristic features which are identifiable in infrared, visible and ultraviolet spectra of a crystal of mixed type Ia and Ib.

Preferably, to determine satisfactory annealing times and temperatures in the present process for a particular kind of crystal, e.g., a crystal containing a certain amount of dissolved type Ib nitrogen as reflected by its infrared, visible and ultraviolet spectra and the intensity of its color, the crystal should preferably be initially produced in the form of a platelet polished on both sides so that the spectra taken thereof are well-defined. The platelet is then annealed at a given annealing temperature for a certain period of time and after each annealing run, its infrared, visible and ultraviolet spectra are taken. A comparison of spectra taken before and after annealing indicates the extent of conversion to type Ia. Also, additional comparisons of such spectra with EPR spectra of the crystal before and after annealing are another indication of the extent of conversion to type Ia. Once the time for annealing this particular kind of crystal has been determined to attain a certain conversion to type Ia, such annealing time and annealing temperature can be used for the same kind of crystal, e.g. a crystal containing substantially the same amount of dissolved type Ib nitrogen, regardless of its size or shape, to attain the same or substantially the same degree of conversion to type Ia nitrogen.

Also, after the reaction rates are determined by experiments on a particular kind of crystal, it is possible to estimate the correct annealing times which would leave a specified amount of type Ib nitrogen in the crystal for crystals having a wide range of type Ib nitrogen concentrations initially.

In the present process from at least about 20% up to about 100% of the total amount of type Ib nitrogen present in the crystal is converted to type Ia nitrogen. However, regardless of annealing conditions a residue of type Ib nitrogen in an amount of less than 1% of the total nitrogen present in the crystal will always remain in the crystal and such type Ib nitrogen residue can be as low as 0.001% or lower of the total amount of nitrogen present in the crystal. A conversion to type Ia nitrogen lower than 20% of the total amount of type Ib nitrogen present in the crystal may not effect the physical properties of the crystal significantly for most applications. The extent or degree of conversion of type Ib nitrogen to type Ia nitrogen depends largely on the particular properties desired. In the annealed crystal produced by the present process which contains both types Ia and Ib, type Ia appears to be uniformly distributed throughout type Ib.

As a result of the present process, at least a portion of the crystal undergoes some change in color or shade, i.e. in a greenish-yellow crystal at least a portion changes toward the yellow or for a yellow crystal a portion becomes at least a shade lighter yellow, the extent of which depends on the extent of its conversion to type Ia. Also, when substantially all or all of the type Ib nitrogen is converted to type Ia nitrogen, the result is a very pale yellow and/or a colorless crystal which has many uses as jewelry, and which frequently is of gem quality.

The annealed diamond crystals produced by the present process are useful as abrasives. The abrasive industry requires numerous types of abrasive materials to carry out various grinding or machining operations, the requirements of which are determined largely by the properties of the material being machined and, to some extent, the results desired. For certain operations in the abrasive industry, synthetic type Ib crystal has been satisfactory and for other operations natural type Ia crystal has been satisfactory. However, as a result of the present invention, the abrasive industry now has available a natural crystal which is a mixture of types Ib and Ia, the composition of which can be controlled to produce crystals with graded physical properties over a wide range to adjust the crystal to the particular abrasive use to which it is applied. Specifically, with increasing degrees of conversion of type Ib to type Ia, the crystal changes in abrasive properties, usually becoming harder and stronger. As a result, a mixed type Ib-Ia crystal can be produced having optimum properties for a particular abrasive use.

When substantially all or all of the type Ib nitrogen in the crystal is converted in the present process, the resultant natural type Ia crystal is also highly useful as an abrasive.

The annealed diamond crystals of the present process are also useful as jewelry, especially those of gem quality.

In such instance where the present annealed crystal, polished or unpolished, has a shape which does not reveal it to be natural, it can be identified as a natural diamond by a known light scattering technique. Specifically, this technique comprises examining the crystal under a microscope by shining a beam of light at an angle thereon and observing the scattered light reflected from scattering centers normally present in synthetic diamond but such scattering centers, and resulting scattered light, are not known to have been seen in natural type Ia or mixed type Ia-Ib diamond crystal.

The invention is further illustrated by the following examples which are tabulated in Table I and wherein the procedure was as follows unless otherwise stated:

A mixed type Ib-Ia natural diamond crystal was used. It was at least partly polished in a conventional manner using a scaife. The resulting plate had a significantly uniform thickness which was about ½ mm. The size of the plate given in Table I is its maximum width.

The crystal was annealed in a reaction vessel as shown in FIG. 2. Graphite rods 6 and 7 were of spectroscopic purity and of the same size, each was 80 mils in diameter and 225 mils in length. A hole 8 was drilled in rod 6 to a size to fit closely around the diamond crystal and any space between the diamond crystal and inner surface of hole 8 was filled with graphite powder of spectroscopic purity. The diamond crystal did not protrude from the drilled hole 8 and electrical contact between rods 6 and 7 was maintained as shown in FIG. 2. Ceramic cylinder 4 was made of alumina and had an inner diameter of about 80 mils and a wall thickness of 60 mils. Cylinder 3 was made of pyrophyllite and had an inner diameter of about 200 mils and a wall thickness of 75 mils. Metallic disc members 1 and 2 were circular, of the same size, each with a diameter of 350 mils and a thickness of 10 mils, and made of tantalum. The discs were in electrical contact with rods 6 and 7 as shown in FIG. 2. To carry out the present annealing process, this reaction vessel was used in the "belt-type" apparatus disclosed in U.S. Pat. No. 2,941,248 — Hall.

Absorption spectra ranging from the ultraviolet through the infrared were made of the diamond crystal at room temperature before and after it was annealed.

Electron paramagnetic resonance (EPR) spectra were made of the diamond crystal at room temperature before and after the crystal was annealed.

With respect to infrared spectra measurements, although the 1130 cm$^{-1}$ band in type Ib crystals is normally used to characterize the Ib crystal, in the present instance, for purposes of accuracy, the 1345 cm$^{-1}$ band which is correlated to type Ib nitrogen was used to determine the conversion of the type Ib nitrogen to type Ia nitrogen.

There are two forms of type Ia diamond, an A band form and a B band form, and these forms are distinguishable by their infrared, visible and ultraviolet absorption spectra. Usually, however, these two forms are most easily differentiated by their infrared spectra wherein the A band form has its main absorption band coming at 1280 cm$^{-1}$ and the B band form has its main absorption band coming at 1175 cm$^{-1}$. While each form of type Ia appears to be thermodynamically more stable than type Ib diamond, the present example produced only an increase in the A band form which is herein referred to broadly as type Ia.

TABLE I

| | | | ANNEALING CONDITION | | | EVIDENCE FOR CONVERSION TO TYPE Ia | | | | | |
|---|---|---|---|---|---|---|---|---|---|---|---|
| | | | | | | INFRARED | | EPR | | VISIBLE-UV | |
| | | | | | | | | Absorption | | | |
| Ex. No. | Size (mm) | Treatment | Temperature (° C) | Pressure (Kilobars) | Time (Min) | Intensity At 1343 cm$^{-1}$ (cm$^{-1}$) | Total % Converted to Ia | Intensity | Total % Converted to Ia | Transmission at 4500 A | APPEARANCE OF CRYSTAL |
| 1 | 1.0 | None | — | — | — | 1.91 | — | 120 | — | Low | Yellow |
| 1A | | Annealed | 1875 | 60 | 30 | .85 | 55 | 66 | 45 | Significantly higher than non-annealed Ex. 1 | Lighter Yellow than Ex. 1 |

Table I illustrates the present invention. The decrease in EPR and infrared intensities in the natural diamond of Table I was used to monitor the conversion of its type Ib nitrogen to type Ia nitrogen. The alternatives that a decrease in these type Ib diamond EPR and infrared intensities could also occur if the Ib nitrogen was diffusing out of the crystal with no conversion to type Ia nitrogen or changing to nitrogen of yet another type were ruled out for two reasons. The first reason is qualitative in that type Ia infrared absorption bands increase, hence there is some conversion to type Ia nitrogen. The second reason is quantitative in that from the type Ib and type Ia absorption bands present one can calculate, based on published data, using standard techniques, the total amount of nitrogen present. For the present annealing experiment this nitrogen content of the diamond of Table I remains constant, within experimental error. For instance, Example 1 had an initial total nitrogen content of 133 ppm. After the annealing the infrared absorption spectra and EPR for Examples 1 and 1A showed that the type Ib nitrogen decreased to 45 percent and 55 percent, respectively, of its original content as shown in Table I, yet the total nitrogen was 135 ppm, the same as before the annealing process. Hence, no change occurred in the total nitrogen content despite the fact that the final type Ib nitrogen was approximately 45 to 55 percent of that originally present.

Therefore, the change in intensity of the type Ib absorption band at 1343 cm$^{-1}$ is a good indication that type Ib nitrogen is being converted to type Ia nitrogen and is not diffusing out of the diamond or being converted to nitrogen of yet another type.

It is understood that the present annealing process can be carried out with the same diamond crystal more than one time to additionally increase the amount of type Ia nitrogen therein. For example, a mixed type Ib-Ia annealed diamond crystal produced by the present process can be annealed in accordance with the present process to convert an additional amount of type Ib nitrogen to type Ia nitrogen.

In copending U.S. patent application Ser. No. 707,298 entitled "Annealing Synthetic Diamond Type Ib" filed July 21, 1976 in the names of Herbert M. Strong, Richard M. Chrenko and Roy E. Tuft and assigned to the assignee hereof, and which by reference is made part of a disclosure of the present application, there is disclosed the annealing of type Ib synthetic diamond crystal at an annealing temperature ranging from about 1500° C to about 2200° C under a pressure which prevents significant graphitization of the diamond during the annealing to convert at least about 20% of the total amount of type Ib nitrogen present in the crystal to type Ia nitrogen and produce an annealed crystal wherein at least about 20% of the total nitrogen present is type Ia nitrogen.

What is claimed is:

1. An annealing process for converting type Ib nitrogen to type Ia nitrogen in natural diamond type Ib crystal or natural diamond mixed type Ib-Ia crystal, each of said crystals having a minimum size of one micron as measured along the longest edge dimension of the crystal, which consists essentially of subjecting a specimen consisting of said crystal to an annealing temperature ranging from about 1500° C. to about 2200° C. under at least a pressure which prevents significant graphitization of said crystal at said annealing temperature for a period of time ranging from about one minute to about 50 hours and sufficient to convert at least about 20% of the total amount of type Ib nitrogen present in said crystal to type Ia nitrogen, the minimum pressure ranging from 48 kilobars at said annealing temperature of 1500° C. to a minimum pressure of 70 kilobars at said annealing temperature of 2200° C., and recovering the resulting annealed free diamond crystal wherein the dissolved nitrogen detectable by ultraviolet, visible and infrared absorption spectra and electron paramagnetic resonance consists of types Ib and Ia nitrogen, said type Ib nitrogen always being present in said annealed crystal in at least a detectable amount, said annealing process making no significant change in the physical dimensions of said diamond crystal.

2. An annealing process according to claim 1 wherein said annealing temperature ranges from about 1600° C. to about 2000° C., and said minimum pressure ranges from 51 kilobars at 1600° C. to a minimum pressure of 63 kilobars at 2000° C.

3. An annealing process according to claim 2 wherein said annealing temperature is about 1900° C.

* * * * *